March 22, 1966 H. A. ENDE 3,241,753
DOUBLE-SECTOR CENTRIFUGATION CELLS
Filed Jan. 2, 1964

INVENTOR.
HERBERT A. ENDE
BY Leonard A. Willson Jr.
ATTORNEY

United States Patent Office 3,241,753
Patented Mar. 22, 1966

3,241,753
DOUBLE-SECTOR CENTRIFUGATION CELLS
Herbert A. Ende, Cary, N.C., assignor to Monsanto
Company, a corporation of Delaware
Filed Jan. 2, 1964, Ser. No. 335,047
9 Claims. (Cl. 233—26)

This invention relates to improvements in the design of what are commonly referred to as double-sector centrifugation cells and, more particularly, to a modification of such cells such that, in operation, the two liquid columns contained therewithin shall automatically and precisely be adjusted to equal heights in a manner obviating the necessity of making corrections for dilution of the samples.

The use of the ultracentrifuge as an aid in studying macromolecules and colloidal substances has its origins in the investigations of Svedberg and Nichols in 1923 and has had a relatively steady advance to a point where, today, it enjoys the status of a vital and highly versatile discipline. The ultracentrifuge has now reached a degree of development such that routine applications may involve centrifugation of samples at speeds conventionally up to 60,000 r.p.m. to thereby generate gravitational fields adequate to separate materials with differences either in molecular weight or density. The ultracentrifuge has been particularly useful in the fields of biochemistry and polymer chemistry in permitting quantitative and qualitative studies of high molecular weight substances.

The refinements in the design of present day ultracentrifuges has been accompanied by improvements in the design of optical systems, sample cells, detection apparatus, etc. to a state that many studies previously impossible are now carried out routinely in a short period of time with a gratifying degree of accuracy. For example, the differential absorption of sedimenting material, as compared to the solvent, using visible and ultraviolet light sources provides a rapid method for studying compositions of, for example, biological and synthetic polymeric materials.

Since the introduction of quantitative density gradient centrifugation by Meselson, Stahl and Vinograd, Procedures of the National Academy of Science, volume 43, page 581 (1957), there has been an increasing demand for a refined centrifuge cell better lending itself to experiments in a way not accommodated by conventional cells. Currently, single-sectored cells are used for density gradient experiments; however, in order to most expediently obtain all the information available, it becomes most important to ascertain the exact position of the "baseline," i.e. that line optically defined by the refractive index gradients of the solvent occupying one of the two sectors, which baseline is representative of the particular solvent-additive mixture under observation.

As the matter of principle, conventional double-sector cells could be utilized to achieve this result, but it is imperative that the two liquid columns attain a precise equality of height in each sector. A recently described double-sector cell would allow the two liquid columns to attain equal heights, but has certain drawbacks, a primary one being the necessity to correct for dilution, a further disadvantage being the fact that the column heights would differ from one run to another. Equality of the two liquid columns is, moreover, especially necessary in the density gradient experiments when interference optics are employed. This is because interference optics essentially involves the comparison of the refractive indices of the liquid in one sector with that in the other at comparable distances from the axis of cell rotation. The liquid in the two sectors is composed of two solvents differing in refractive index and, upon centrifugation, the heavier solvent sediments towards the bottom of the cell. This sedimentation is strongly opposed by backdiffusion, and, at a given speed the flow of the heavier solvent through a unit area within the cell due to sedimentation and diffusion is equal, thus establishing a stable density gradient within the two sectors. It can be shown that the magnitude of the density gradient depends on the column heights of the liquid. Thus, if the column height in the two sectors do not match precisely, the refractive index at a given distance from the axis of rotation differs in one sector from that in the other. As a result of this inequality in column heights, the baseline in the interference diagram becomes skewed; whereas, for proper evaluation of such a diagram, it is imperative that the baseline be straight. Thus, straightness of the baseline can only be assured by insuring that the column heights in both sectors are equal.

The desirability of a double-sector cell design assuring an equality of column height of the liquids occupying the two sectors or sample chambers is, therefore, clearly indicated.

In my co-pending applications Serial No. 335,046 filed Jan. 2, 1964 and Serial No. 335,148 filed Jan. 2, 1964, there are disclosed improved centrifugation cell designs similar to that of the present invention wherein overflow grooves communicate between each sector of a double-sector cell and its respective reservoir; these grooves, either alone or in combination with a transfer groove communicating between the two sectors, function to assure a substantial equality of the heights of the liquid columns contained within the respective sectors or sample chambers. With regard to the cell design constituting the subject matter of Serial No. 335,046, however, limitations inherent in conventional machining techniques render it difficult, if not impossible, to assure a precise equality of the heights at which the respective overflow grooves are caused to juncture with their respective sample chambers, though the disparity is normally quite small (less than 0.003 inch) and can, for many purposes, be tolerated. On the other hand, the cell designed constituting subject matter of Serial No. 335,148, though it overcomes the difficulties due to any disparity between the juncture levels, does so only by effecting a transfer of liquid from one sector to another, thereby diluting the liquid within the receiving sector and rendering it necessary to correct the observed results for such dilution.

It is, therefore, an object of the present invention to provide an improved double-sector cell design for use in ultracentrifugation procedures, which cell, when subjected to a centrifugal field of sufficient magnitude, will automatically attain a precise equality in the heights of the liquid columns occupying the respective sectors or sample chambers.

A further object of my invention is the provision of a double-sector centrifugation cell having means operative to insure the equalization of the heights of the liquid columns contained within each cell, such column heights equalization taking place automatically and only when the cell is subjected to a predetermined minimum centrifugal force.

Still another object is the provision of a double-sector centrifugation cell having the above related capabilities and which is of such design as to precisely compensate for any variance in the heights of the junctures of the overflow grooves with their respective sectors or sample chambers.

Yet another object is a centrifugation cell as related above which is of such design as to accomplish a precise equalization of the liquid column heights without dilution of the contents of one sector by that of the other.

According to my invention, the foregoing and other objects are attained by an easily effected modification of an otherwise conventional double-sector centrifugation cell utilized in ultracentrifugation procedures, which modification renders such cell operative to automatically establish an equality in the heights of the liquid columns contained within each sector or sample chamber upon subjection of the cell to a predetermined minimum centrifugal force, this being accomplished even in the presence of a variance in the levels or positions of the junctures of the overflow grooves with their respective sectors or chambers and without the necessity of diluting the contents of one of the sectors by that of another. This modification takes the form of a system of grooves, conduits and reservoirs communicating with the respective sectors in such a fashion that, upon rotation of the cell at a predetermined speed, any liquid exceeding a predetermined common level within the sectors, as measured in a radial direction through such sectors, will be caused to be discharged into the reservoirs. This is accomplished by the provision of a pair of overflow grooves, each communicating between one of the sectors and a common, small diameter conduit extending between the two end surfaces to the cylindrical cell body at a slight inclination to its axial dimension to communicate on the opposite face from that containing the overflow grooves with a central groove which, in turn, communicates with the two reservoirs by way of suitable branch grooves. Suitable pressure equalization grooves are also provided to communicate between the upper, or radially inward region of each sector and its respective reservoir. By virtue of the fact that overflow grooves communicate with a common, small diameter conduit, it is quite possible to machine these grooves to intersect the conduit at virtually precisely equal levels. By this arrangement, upon subjecting the cell to a predetermined speed of rotation, any liquid within each chamber or sector exceeding the level of its juncture with its respective overflow groove will be urged by centrifugal force thereupon through such groove and into a conduit to ultimately be conveyed to the reservoirs. It is important to observe that this equalization of the column heights is accomplished with high precision and without dilution of the liquid occupying one sector by that of the other.

In ultracentrifugation procedures generally, there is provided a relatively massive and precisely configured rotor mounted to be rotated at extremely high speeds, conventionally in excess of 60,000 r.p.m., within an enclosed, evacuated chamber to better retard temperature rises due to atmospheric friction. One or more cylindrical wells are formed in such rotor to extend, in their axial dimension, substantially parallel to the axis of rotation of the rotor element, these wells being shaped to receive cell assemblies of conventional construction. Such a cell assembly normally comprises a barrel or external housing, the cell proper being positioned therewithin at substantially its midpoint. Once the cell has been properly positioned within the barrel, cell windows, of quartz or other suitable material, are positioned in each end of the barrel to bear in fluid-tight engagement against the two end surfaces of the cell proper. So assembled, the barrel is then mounted within the rotor and a run commenced. The general details of ultracentrifuge construction and operation are well and comprehensively presented in Ultracentrifugation in Biochemistry by Howard K. Schachman, 1959, Academic Press, which is hereby incorporated by this reference thereto.

With the understanding that the constructional and operational details of the ultracentrifuge, as above generally referred to, are not considered to constitute a part of my invention, reference shall now be had to the details of the cell proper, an illustrative, but not limitative, embodiment of which is shown in the drawing, and in which.

Figure 1:
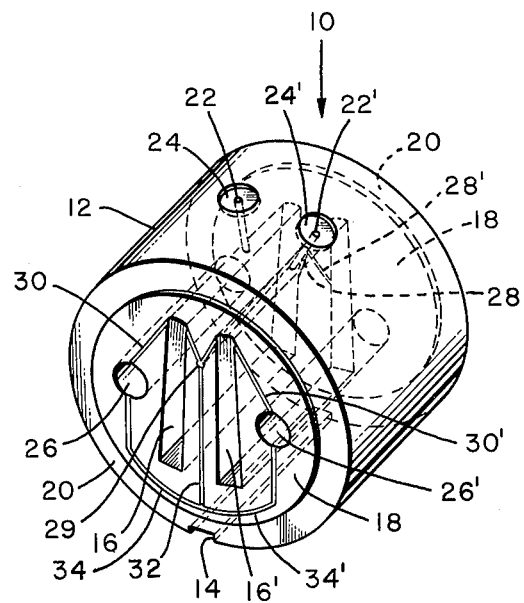
FIG. 1 is a perspective view showing certain features in phantom lines.

As shown in the drawings, on a scale approximately five times actual size, the improved cell construction which constitutes my invention takes the form of a double-sector cell, generally indicated by reference numeral 10, having a cylindrical body member 12 provided with a longitudinally extending positioning groove 14, which groove is designed to mate with a tongue member formed integrally along the internal wall of the barrel housing, not shown, which tongue-and-groove arrangement assures proper alignment of the cell within the barrel and of the barrel within the rotor. In the following discussion, it will be assumed that the ultracentrifuge rotor is mounted to spin about a substantially vertical axis, the barrel being positioned within the rotor a radial distance from the axis of rotation, conventionally in the range of 60 to 65 mm. The barrel, and the associated cell illustrated in the drawing, will normally be positioned within the rotor so that their longitudinal dimension parallels the axis of spin. The result is that cell 10 is subjected to high-speed rotation about an axis substantially paralleling the axial dimension of the cell in such fashion that the centrifugal forces generated will act vertically downward across the face of the cell, as viewed in FIG. 1 of the drawing, i.e. in the direction of arrow 10.

Within the cell body, there is formed a pair of sector-shaped sample chambers 16, 16', each chamber subtending a sector angle conventionally ranging between two and four degrees. When the cell has been properly positioned within the rotor preparatory to a run, the side walls of these sector-shaped chambers extend along radial lines intersecting the spin axis. The chambers 16, 16' extend entirely through the axial dimension of the cylindrical body 12 to be exposed at either end thereof in the plane of the slightly raised end surfaces 18, 18'. The cylindrical body 12 is provided with recessed shoulder portions 20 completely surrounding raised end surfaces 18, 18' to promote the integrity of the fluid seal formed between such end surfaces and the previously referred to cell windows, which latter are mounted in pressing engagement thereagainst. The cell is filled after it has been clamped within the barrel between the cell windows by way of individual filler conduits 22, 22' which, on assembly, register with suitably placed ports in the barrel, not illustrated. Plug depressions 24 surround each of the filler conduits to receive and seat plugs, not shown, inserted through the barrel wall to seal the sample chambers.

Figure 2:
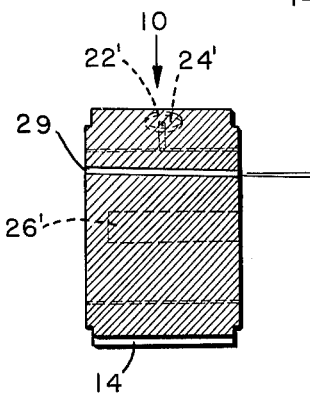
FIG. 2 is a sectional view taken on line 2—2 of FIG. 3 and showing certain features in phantom lines.
Figure 3:
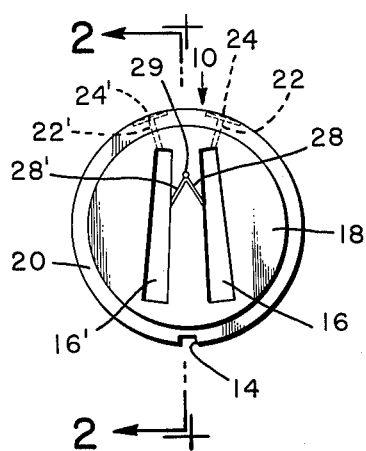
FIG. 3 is an end view of the cell taken opposite that end shown in FIG. 1.

It is be acknowledged that the cell structure described up to this point is that of a conventional double-sector cell which may easily be modified according to the present invention, as will now be described. Disposed laterally of each of the sample chambers there is formed a reservoir 26 extending between one of the end surfaces 18 axially of the cell body to a depth suitable to accommodate the anticipated overflow, 10 mm. having been found adequate. Obviously, the required capacity of the reservoirs will, in large measure depend upon the level of the junctures of the overflow grooves. Extending entirely through the cell body and communicating between the end surfaces there is provided a conduit 29 which, as seen in FIG. 2, is inclined at a slight angle of, for example, from 1 to 3 degrees to the axial dimension of the cell body. On the end surface opposite that containing the reservoirs there are formed two V-shaped grooves, preferably of a 60° slope and 0.003 inch depth, each of which overflow grooves 28, 28' communicates between the conduit 29 and one of the sectors or sample chambers 16, 16'. On the end surface containing the reservoirs, a central groove 32 communicates between conduit 29 and branch feeder grooves 34, 34', which in turn communicate with the respective reservoirs 26, 26'. There are also provided essential pressure equalization grooves 30, 30' communicating between the upper regions of the sectors, as viewed in FIG. 1, and the respective reservoirs.

In operation, the sectors are filled to an indiscriminate level above the junctions of overflow grooves 28, 28' with conduit 29. When the cell is accelerated to a level generating sufficient centrifugal force to overcome the resistance to flow presented by the small dimensioned overflow grooves, any liquid exceeding the level of the right hand end of conduit 29, as viewed in FIG. 2, will be caused to discharge therethrough and, by virtue of the inclination of the conduit the liquid from both sectors will be urged towards the opposite face of the cell to be discharged through central groove 32 and branch feeder grooves 34, 34' into the reservoirs 26, 26'. The liquid columns in the two sectors will, therefore, adjust to a level which corresponds to the level of the junctions of overflow grooves 28, 28' with conduit 29.

It may now be appreciated that there has been herewith disclosed a novel and unobvious modification of a double-sector centrifugation cell capable of automatically attaining a high precision in the equality of the liquid column heights occupying the two sectors without sample dilution and even where, due machining limitations, there is a disparity between the heights of the junctures of the overflow grooves with their respective sectors. It is to be noted that the various grooves are designed to be of sufficiently small dimension as to obstruct fluid passage under forces normally encountered by operator manipulation and at low speeds of rotation; the sample filled cell may, therefore, be freely manipulated by the operator without risking a depletion of the liquid in either cell below the level of the respective overflow groove junctures. Obviously, numerous modifications and variations of the present invention will suggest themselves in the light of the above teachings. It is, therefore, to be understood that, within the scope of the appended claims, the invention may be practiced otherwise than as specifically described herein.

What is claimed is:

1. A self-adjusting cell for use in centrifugation procedures comprising a cell body, a pair of sample chambers extending through said body, each chamber having inboard and outboard ends, reservoir means formed in said body, a conduit extending through said body intermediate said chambers, first fluid passage means communicating between one end of said conduit and each of said chambers, second fluid passage means communicating between the opposite end of said conduit and said reservoir means, whereby, upon subjecting said cell body to a predetermined centrifugal force, fluid within each of said chambers exceeding the level of said one end of said conduit will discharge into the reservoir means to thereby establish a precise equality of fluid column heights within the respective chambers.

2. The centrifugation cell defined in claim 1 wherein said cell body is in the form of a right circular cylinder, said conduit extending through said body at a small inclination to the axial direction thereof.

3. The device as recited in claim 2 wherein said first and second fluid passage means are in the form of grooves formed in the surface of said cell body.

4. The device as recited in claim 3 wherein said grooves are V-shaped cross-section and of such depth as to obstruct fluid passage therethrough when said cell is subjected to inertia forces below a predetermined level.

5. The device as recited in claim 4 wherein the depth of said V-shaped grooves is less than 0.004 inch.

6. The device as recited in claim 5 and further characterized by a pair of vent means, each of said vent means interconnecting the inboard region of one of said chambers, said opposite end of said conduit and said reservoir means.

7. The device as recited in claim 6 wherein each of said vent means is characterized by a V-shaped vent groove formed in the surface of said body, said vent grooves being of such depth as to obstruct fluid passage therethrough when said cell is subjected to inertia forces below a predetermined level.

8. An automatic level-adjusting cell for use in centrifugation procedures comprising a cell body of right circular cylindrical configuration; radially spaced, sector-shaped twin sample chambers extending axially through said body, each chamber having inboard and outboard ends, a pair of reservoirs formed in said body, each disposed laterally of one of said chambers, a conduit extending through said cell body intermediate said chambers and at a small inclination to the axial direction of said body, a V-shaped overflow groove communicating between each of said chambers and one end of said conduit, groove means communicating between the opposite end of said conduit and each of said reservoirs, whereby, upon subjecting said cell body to a predetermined centrifugal force, fluid within each chamber exceeding the level of said one end of said conduit will discharge into said reservoirs to thereby establish a precise equality of fluid column heights within the respective chambers.

9. In a cell for use in centrifugation procedures, said cell being of the type characterized by a pair of radially spaced, sector-shaped twin sample chambers formed in a cylindrical cell body, each of said chambers having inboard and outboard ends, the improvement comprising a pair of reservoirs, each disposed laterally outwardly of one of said chambers, a small diameter conduit extending through said cell body intermediate said chambers, first fluid passage means communicating between one end of said conduit and each of said chambers, second fluid passage means communicating between the opposite end of said conduit and said pair of reservoirs, said conduit extending at a slight inclination through the axial direction of said cell body.

References Cited by the Examiner

UNITED STATES PATENTS 2,340,825   2/1944   Stern _____ 233—66

OTHER REFERENCES

Laboratory Investigation, volume 2, Number 6, Nov.–Dec. 1953, published by Harper and Brothers, Philadelphia, pages 441 to 446.

M. CARY NELSON, *Primary Examiner.*